Figure 1:
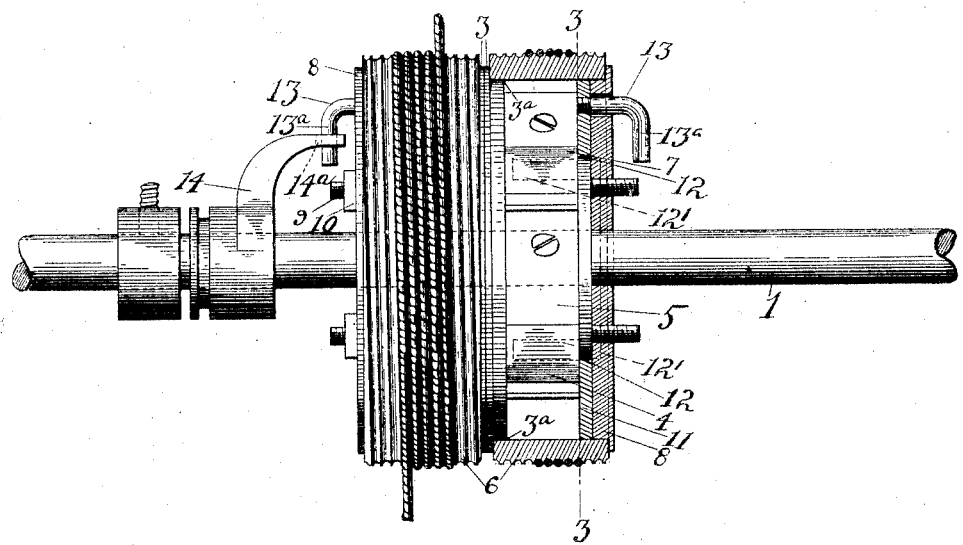

No. 879,016. PATENTED FEB. 11, 1908.
F. STARR.
CLUTCH.
APPLICATION FILED OCT. 26, 1907.

Attest:
Benton H. Stahl.
Ewd L. Folson.

Inventor.
Fred Starr.
By Spear Middleton Donaldson & Spear,
Attys.

UNITED STATES PATENT OFFICE.

FRED STARR, OF SAN FRANCISCO, CALIFORNIA.

CLUTCH.

No. 879,016. Specification of Letters Patent. Patented Feb. 11, 1908.

Application filed October 26, 1907. Serial No. 399,364.

*To all whom it may concern:*

Be it known that I, FRED STARR, a citizen of the United States, residing at San Francisco, California, have invented certain new and useful Improvements in Clutches, of which the following is a specification.

My invention relates to improvements in clutch mechanism of that class which is designed to transform an intermittent oscillat10 ing motion into a rotary motion in one direction.

The invention is designed more especially for use in connection with a wave motor, such as shown in Letters Patent #840460 granted to me Jan. 1, 1907, in which the reciprocating movement imparted to an element by the motion of the waves is transferred to a rotary shaft by means of cables which pass around drums which, through the clutch mechanism impart the rotary motion to the shaft. The clutch mechanism includes such an exterior casing or drum mounted loosely upon the shaft to which rotary movement is to be imparted, while within the casing and upon the rotary shaft is a clutch member or core having in its periphery a series of pockets which are inclined to any radius of the casing so as to be wider at the bottom than at the top, round bodies, such as balls or rolls being located in these pockets. Owing to the excessive strain, the plane surfaces of the pockets upon which the rollers bear during the gripping action are subjected to a great deal of wear, and consequently these surfaces are provided with wear plates which are capable of being removed and renewed.

It is the object of the present invention to provide a construction, which, while being simple, durable and efficient, shall yet be capable of being so manipulated as to permit of access to the pockets for the removal of the wear plates without changing the core in any way or removing the cables from the drum.

I have also aimed to provide such a clutch with means whereby the balls or rollers which effect the gripping action may be held out of gripping action when desired whereby the clutch will be inactive.

With these and other objects in view the invention includes the features of construction and arrangement and combination of parts hereinafter described and particularly set forth in the appended claims.

An embodiment of the invention is shown in the accompanying drawings, in which,—

Figure 2:
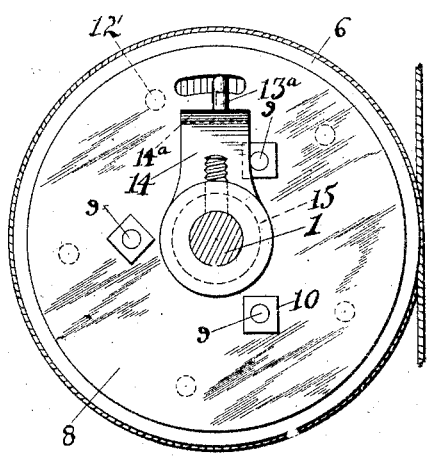
Figure 3:
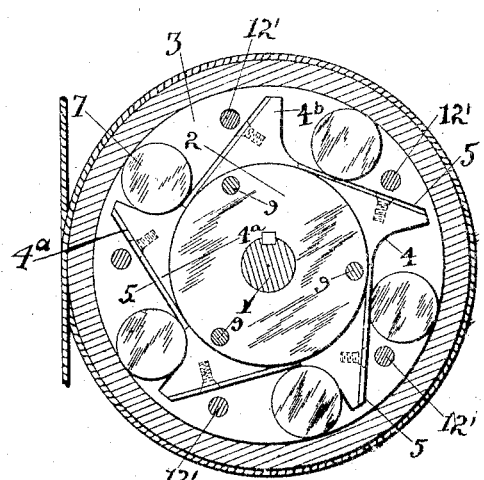
Figure 4:
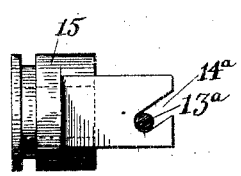

Figure 1 is a front elevation partly in section. Fig. 2 is a side elevation. Fig. 3 a section on line 3—3 of Fig. 1. Fig. 4 is a detail view.

Referring by reference characters to these drawings, the numeral 1 designates the shaft to which rotary movement is to be imparted. Upon this is keyed or otherwise rigidly secured, a hub 2 which is provided with a central web member 3 and side pockets 4. The pockets have preferably each a plane face extending at an angle to the radius of the hub as shown at $4^a$, and a face $4^b$ which may be disposed approximately radial to the hub, and preferably join the plane face with a curve. The plane face, or that upon which the wear comes in the gripping action, as herein described, is provided with a removable wear plate 5.

Upon each side of the central web 3 and encircling the clutch pockets just described is located a cylindrical shell 6 which has spiral grooves in its periphery for the reception of the cable which is wound thereon in the manner well understood by those skilled in the art. Each shell 6 has its end fitting in an annular rabbet $3^a$ in the web. Between each shell and the hub and in the corresponding pockets are located the round bodies, such as balls or rolls as shown at 7, and it will be seen that oscillation of the shell or casing in one direction will cause the rollers to travel outward within the pockets along the wear plates and to thus be wedged between the shell and wear plates locking the casing or shell firmly to the shaft while on rotation in the opposite direction the rolls will drop back in the deeper portions of the pockets freeing the casing or shell from the shaft. These clutches are both alike and put upon the shaft the same way. They take the power at different times, and on opposite movements of the propelling device, because of the manner of wrapping and hitching the cables. The cable is wrapped around one clutch from right to left, and around the other clutch from left to right (exactly the opposite) and both cables are attached to the same propelling device or head, thus giving one clutch a forward revolving motion on the upward pull or strain on one cable and giving the other clutch a forward revolving motion on the downward pull or strain of the other cable. The grooved casings or shells are held in place upon the rabbeted portion of the central web and encircling the clutch portions of the hub by plates or disks 8, which are secured to the hubs by bolts 9 passing through openings in the plates and carrying nuts 10. Between each plate and the corresponding clutch portion of the hub is located an annular ring 11, the hub being rabbeted as shown at 12 to form a seat for the ring. This ring carries a plurality of pins 12', one for each pocket, and each ring has a rod or arm 13 which projects through an elongated slot in the disk 8. This arm has a turned over end as shown at 13$^a$ and this is engaged by an inclined slot 14$^a$ in an arm 14, which is carried by a collar 15 splined or otherwise suitably secured upon the shaft so as to rotate therewith, while being capable of longitudinal movement on the shaft.

The collar is provided with an annular groove designed to receive the fork of a shifting lever (not shown). By operating the shifting lever and thus moving the collar towards or from the clutch the engagement of the angularly turned arm with the inclined slot will cause the pin carrying ring to be rotated in one direction or the other. When it is moved in such a position as to carry the pins into the outer or narrow portions of the slots, the balls will be free to be operated in the ordinary manner to clutch the shell to the shaft, while if the pins be moved in the opposite direction the balls will be held in the deeper portions of the pockets, and the clutch will be inoperative.

Should it at any time be necessary to get access to the interior of the clutch for the purpose of renewing the wear plates, or the rollers, or for any other like purpose, it is only necessary to move the shifting collar along the shaft, to unscrew the nuts holding the disks in position and to slide them along the shaft away from the clutch member, whereupon the grooved shell upon which the cords are wound may be slid longitudinally of the shaft to expose the balls and plates. If it be necessary to remove the balls and wear plates and replace the same, the pin rings are likewise shifted longitudinally of the shaft, whereby the rollers and plates may be renewed as desired. All this may be accomplished without removing the cables from the drums, as there is sufficient slack in the cables to permit of the slight lateral motion of the shells necessary to effect this movement.

By my present construction it will be seen that the two oppositely acting clutches are brought together upon the same portion of the shaft, and yet the interior parts of each are readily accessible.

Having thus described my invention, what I claim is:—

1. In a clutch, a driven shaft, an inner clutch member fast thereon and having peripheral pockets and having a rigid web or flange at one side of the pockets, an outer casing loose on the clutch member and supported at one side by said web, a removable retaining plate detachably connected to the inner clutch member and supporting the other side, and gripping devices in said pockets, substantially as described.

2. In a clutch, a driven shaft, an inner clutch member fast thereon and having peripheral pockets, and a rigid web at one side of said pockets provided with an annular rabbet, a retaining member removably secured to said inner clutch member and having an annular rabbet, an outer casing encircling said inner clutch member and having its edges resting in said rabbets and gripping devices in the pockets, substantially as described.

3. In a clutch, a driven shaft, an inner clutch member fast thereon, having pockets, an outer casing loose on said member, loose gripping devices in the pockets, a ring carrying a plurality of pins projecting into the pockets, an arm on said ring and a member longitudinally movable on the shaft and having a portion in proximity to the arm, said arm and said portion having an inclined slot and the other a projection engaging the slot, substantially as described.

4. In a clutch, a driven shaft, an inner clutch member fast thereon having pockets and a side web, an outer casing encircling said member and having one edge rotatably supported by said web, a removable retaining member supporting the opposite edge with means for holding it in place, a ring seated between the inner clutch member and retaining member and having pins projecting into the pockets, gripping devices in the pockets, an arm on the ring projecting through a slot in the retaining device, and means coöperating with said arm for rotating the ring, substantially as described.

5. In a clutch, a driven shaft, a pair of inner clutch members fast thereon having oppositely inclined pockets and an intermediate web, outer casings loose on said inner clutch members and separated by said web, gripping devices in said pockets and removable retaining plates secured to the outer faces of said inner clutch members and retaining the outer casings of the rings in place, substantially as described.

In testimony whereof, I affix my signature in presence of two witnesses.

FRED STARR.

Witnesses:
J. H. BACON,
JAS. F. HARASTA.